(12) United States Patent
Benson et al.

(10) Patent No.: US 7,116,283 B2
(45) Date of Patent: Oct. 3, 2006

(54) METHODS AND APPARATUS FOR IMPROVED DISPLAY OF VISUAL DATA FOR POINT OF SALE TERMINALS

(75) Inventors: Christopher Michael Benson, Lawrenceville, GA (US); Daniel Frederick White, Lilburn, GA (US)

(73) Assignee: NCR Corporation, Dayton, OH (US)

( * ) Notice: Subject to any disclaimer, the term of this patent is extended or adjusted under 35 U.S.C. 154(b) by 209 days.

(21) Appl. No.: 10/208,285

(22) Filed: Jul. 30, 2002

(65) Prior Publication Data

US 2004/0021615 A1    Feb. 5, 2004

(51) Int. Cl.
*G09G 5/00* (2006.01)

(52) U.S. Cl. .................... 345/1.1; 348/415.1
(58) Field of Classification Search ............. 345/1.1, 345/1.2, 100, 212–214; 348/409.1, 415.1; 705/64, 73
See application file for complete search history.

(56) References Cited

U.S. PATENT DOCUMENTS 5,764,201 A * 6/1998 Ranganathan ............... 345/3.3
6,344,850 B1 * 2/2002 Okumura et al. ........... 345/204
6,487,068 B1 * 11/2002 Rahemtulla .................. 361/681
6,513,015 B1 * 1/2003 Ogasawara .................. 705/26
6,825,846 B1 * 11/2004 Mondal ....................... 345/547
2002/0067427 A1 * 6/2002 Klein ....................... 348/409.1

* cited by examiner

*Primary Examiner*—Amr A. Awad
*Assistant Examiner*—Tom Sheng
(74) *Attorney, Agent, or Firm*—Priest & Goldstein, PLLC; Charles Maney

(57) ABSTRACT

Improved techniques for transmission and display of video data are described. A point of sale terminal includes a processor, memory and software executed by the processor to create frames of data and to analyze the frames of data to create differential data defining differences between preceding and succeeding frames of data. The differential data can be applied to the preceding frames to construct the succeeding frames. At least one frame is transmitted to an external video interface using an external connection such as a universal serial bus port. Differential data is also transmitted to the external video interface. The differential data is applied to the frame which has been transmitted in order to create succeeding frames. The frames of video data are displayed using a display connected to the video interface.

11 Claims, 5 Drawing Sheets

METHODS AND APPARATUS FOR IMPROVED DISPLAY OF VISUAL DATA FOR POINT OF SALE TERMINALS

FIELD OF THE INVENTION

The present invention relates generally to improved display of visual information in point of sale terminals. More particularly, the invention relates to techniques for analyzing video data to create differential video data which can be used to reconstruct the video data and which can be transmitted using a channel having a relatively narrow bandwidth, transmitting the differential data to a supplemental decoding device and allowing the supplemental decoding device to reconstruct the video data for display.

BACKGROUND OF THE INVENTION

Visual displays of one kind or another have been present in point of sale terminals for many years. The steadily increasing sophistication of electronics used in point of sale terminals has increased the amount of visual information which may displayed. Retailer awareness of the ability of point of sale terminals to display large amounts of information has tended to increase the amount of information which retailers desire to display.

Modern point of sale terminal hardware and software can easily generate enough visual information to be displayed on multiple displays. For example, a terminal might have two displays, one displaying the details of the transaction and another displaying promotional messages. One point of constraint which tends to inhibit the use of multiple displays is that prior art terminals typically employ one of two techniques in order to drive multiple displays. One such technique is the use of multiple video cards, one video card for each display. This approach adds expense because an additional video card is added for each added display. In addition, each video card requires an expansion slot, making the slot unavailable for other uses. Another commonly used technique is the use of special video adapter cards which are designed to drive two or more displays. These cards tend to be expensive.

Modern point of sale terminals are typically built using computers such as personal computers. Personal computers typically provide one or more data output ports that may include serial ports, wireless interfaces and ports, universal serial bus ports and the like. The data output ports allow the computers to transmit data to and receive data from other devices. For example, the universal serial bus port is widely used and allows connection to a wide variety of different devices. However, version 1.1 of the universal serial bus port in particular does not provide sufficient bandwidth for acceptable driving of a display using typical prior art video technology which is cost effective from a customer point of view.

The use of additional hardware, or specialized, expensive hardware to enable a terminal to drive two or more displays limits the appeal of the terminal because retailers who need only a single display will not wish to pay for the added capability provided by a terminal that can drive two or more displays. However, it will be recognized that even retailers presently needing only one display may greatly desire the flexibility of adding one or more additional displays in the future if that flexibility is achieved at little or no additional cost for the initial purchase of the terminal. Furthermore, the retail business is a highly competitive and cost conscious so that even retailers wanting two or more displays will want them at the lowest possible cost. There exists, therefore, a need for techniques which allow a terminal to be optionally configured to drive two or more displays without a need to build additional hardware into the terminal, and which allow the terminal to transmit video data to two or more displays using standard output ports commonly included in computers used in point of sale terminals.

SUMMARY OF THE INVENTION

A point of sale terminal according to an aspect of the present invention includes a computer such as a personal computer (PC), suitably including a conventional video card for controlling a primary display. The data processing hardware within the computer prepares images and transfers the images to the video card in the form of frames, which are displayed in sequence. The video card is controlled using conventional video driver software. The video driver software receives and processes the frames to be displayed and furnishes the frames to the video card for display.

In addition, the computer hosts a secondary video control program, or secondary video generator, which processes video data for display by each of one or more secondary displays. The secondary video generator receives frames of video data and analyzes the frames to identify differential information defining changes between a frame and an immediately succeeding frame. The first frame to be displayed is transferred to one or more secondary video interfaces, each of which may suitably be connected to the computer using a relatively low bandwidth common system port such as a universal serial bus (USB) port. The secondary video interface or interfaces which display the frame using a conventional video card controlling a secondary display. Appropriate differential data is then transferred to the secondary video interfaces, each of which combines the first frame with the differential data to construct the second frame, and continues to combine the second and subsequent frames with incoming differential data to create a sequential series of frames for display. The creation of the differential data makes it possible to transfer data over the relatively low bandwidth channel such as the USB channel in order to allow addition of one or more secondary displays without a need for additional video cards or a need to redesign a computer or open an existing in-store computer in order to add additional hardware to retrofit it. Instead, supplemental video interfaces designed to decode the differential data for display are connected using existing external connection ports. Such interfaces may be built into the secondary displays that are to be added. Moreover, it is not necessary to add a secondary terminal unless desired, so that a user who needs only the primary display need not incur the added expense of a secondary display capability.

A more complete understanding of the present invention, as well as further features and advantages of the invention, will be apparent from the following Detailed Description and the accompanying drawings.

DETAILED DESCRIPTION

Figure 1:
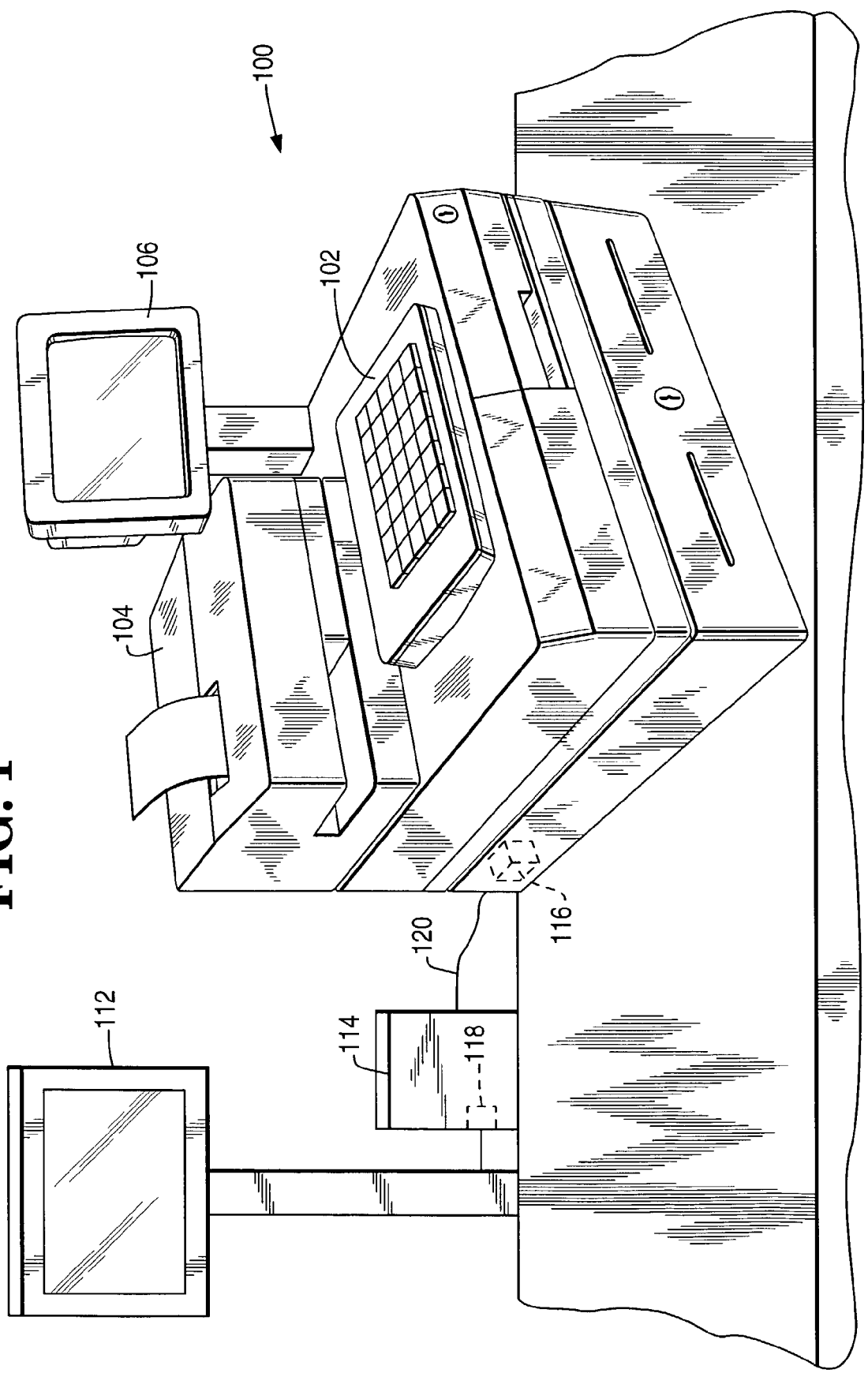
FIG. 1 illustrates a point of sale terminal according to an aspect of the present invention.

FIG. 1 shows an external perspective view of a point of sale terminal 100 according to the present invention. The terminal 100 may suitably include a keypad 102, printer 104 and primary display 106. The primary display 106 may suitably be driven by a conventional video output produced by a conventional video card contained inside the terminal 100.

In addition to the primary display, the terminal 100 may also include one or more secondary displays such as the display 112. The display 112 is driven by an external video interface 114. The video interface 114 preferably receives video data from a universal serial bus (USB) port 116 located in the terminal 100. The video interface 114 processes the video data into a visual signal and provides this visual signal to the display 112 using a conventional video port 118. For simplicity of illustration, only one secondary display and external video interface are shown here, but a terminal such as the terminal 100 may accommodate a number of additional secondary displays and accompanying video interfaces. For each display, a video interface is plugged into an available port and used to drive an accompanying display. It will be recognized that a video interface such as the video interface 114 may be built into a display such as the display 112, but the video interface 114 and the display 112 are shown separately here for ease of description.

Figure 2:
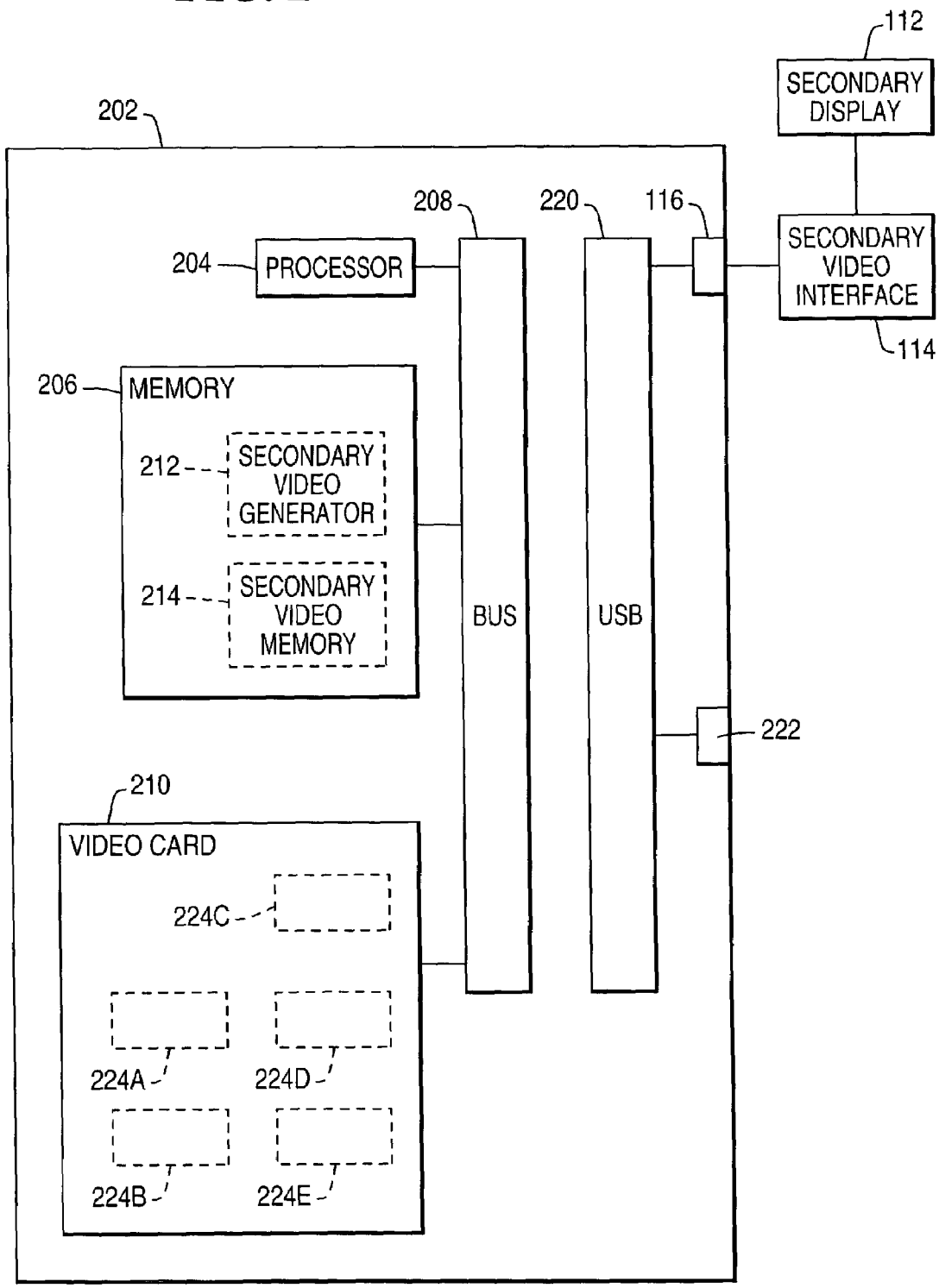
FIG. 2 illustrates additional details of a point of sale terminal according to an aspect of the present invention.

FIG. 2 illustrates selected internal functional components of the point of sale terminal 100 of FIG. 1. The terminal 100 includes a computer 202 which operates to receive operator inputs and other data, to process and store data and to provide visual and other information for the operator. The computer 202 may suitably be a personal computer (PC) with appropriate software to support its operation as a point of sale terminal. The computer 202 includes a processor 204 and memory 206. The processor 204 and memory 206 communicate between themselves and with other components through a bus 208. The computer 202 also includes a video controller, illustrated here as a video card 210, used to drive the primary display 106. It will be recognized that the video controller need not be implemented as a video card, but may be integrated into the system board (not shown) of the computer 202, using techniques that are known in the art. In addition, the computer 202 hosts a secondary video generator 212, preferably implemented as a software program executed by the processor 204, to allow compact transmission of video data to one or more secondary displays. The secondary video generator 212 is seen here as residing in the memory 206. The memory 206 can be seen to include secondary video memory 214, which is a portion of the memory 206 allocated to the secondary video generator 212 in order to support the performance of its functions. The secondary video memory 214 does not differ from the memory 206 and need not be permanently allocated by the secondary video generator 212, but is simply allocated by the secondary video generator software 212 when and as needed. The secondary video generator 212 prepares video data for transmission to one or more external video interfaces such as the interface 114 of FIG. 1.

The computer 202 also includes a universal serial bus (USB) 220. Depending on the design of the computer 202, the USB may be a version 1.1 USB with a bandwidth of approximately 12 megabits per second or a version 2.0 USB with a bandwidth on the order of hundreds of megabits per second. The present invention is not limited to the use of a version 1.1 or 2.0 USB, but can easily be adapted to other USB versions or other connection or interface techniques presently existing or to be developed in the future, for example Bluetooth or other wireless connections. In such cases, the teachings of the invention should be adapted to generally available standard interface techniques, so that the invention could be employed to generally available systems with little change.

In the present exemplary embodiment, the USB 220 supports first and second USB ports 116 and 222, respectively, and provides a standardized connection to external devices. The USB ports 116 and 222 may be used to provide connections to video interface devices such as the video interface 114. For example, the device 114 may be connected to the port 222A and a similar device may be connected to the port 222. If additional USB ports are available, additional interface devices may be connected. All these connections may be made without any need to open the computer 202. However, a retailer or other user of a terminal such as the terminal 100 does not need to connect any video interface devices such as the interface 114 if he or she has no need for additional displays supported by these devices. Devices such as the interface 114 may be sold separately from the terminal 100 and purchased only by users who need additional display capabilities. Thus, a high degree of flexibility is provided to all customers in a highly cost effective manner.

The computer 202 performs numerous tasks related to point of sale processing, such as receiving data from the keypad 102, transmitting data to the printer 104 or retrieving data, such as product price data, for example, from an external server (not shown). Of particular interest in connection with the present invention is the role of the computer 202 in preparing and transmitting video data for display. The computer 202 provides video data to the primary display 110 in a conventional fashion. That is, the processor 204 passes data to the video card 210, which creates frames of video data and sequentially provides frames of data to the display 110. The video card 210 operates by providing video memory which can be organized as frames. The video card 210 may, for example, provide memory space for frame spaces 224A–224E. In such a case, each frame of video data received from the processor 202 is initially stored in frame space 224E. The frame of data successively moves from frame space 224E, to frame space 224D, and so on to frame space 224A, and from frame 224A to the display 110. As a frame of video data moves out of a frame space, that frame space becomes available for storage of a new frame. Thus, as each frame of data is transmitted to the display 110, a new frame can be accommodated in frame space 224E.

The video data to be transmitted to the secondary displays such as the display 112 is adapted to pass to the USB 220 and from there to one or more of the USB ports 116 or 222 or another USB port and from there over a USB cable 120 to an external video interface such as the interface 114. Transmitting data over the USB channel is subject to bandwidth constraints much more severe than those associated with conventional display of video data. In addition, it may be desired to support a plurality of displays using data transmitted over the USB channel. Supporting a plurality of displays adds to the demands on the channel. Therefore, in order to economize on bandwidth, the computer 202 according to the present invention typically does not transmit entire video frames over the USB channel. Instead, in most cases, the video data transmitted over the USB channel is differential data defining differences between a preceding frame and a subsequent frame.

Data which is to be displayed using the secondary display such as the display 112 is passed to the secondary video generator 212, which appears to the operating system and other software of the computer 202 as a conventional video driver. The processor 204 causes frames of data to be passed to the secondary video generator 212. The first frame of data is stored in the secondary video memory 214 and also transmitted to the video interface 114. This first frame is not cleared from the secondary video memory 214 after transmission. The transmission of the first frame is relatively slow because of the bandwidth constraints imposed by the USB channel, but this transmission is typically accomplished at initial startup of the terminal 100, when there is little need for fast display of the data.

Video data subsequent to the first frame is prepared and transmitted for display by preparation of differential data. That is, each succeeding frame to be displayed is compared with the preceding frame. The changes between the preceding frame and the succeeding frame are identified and differential data is prepared to define these changes.

As the first frame is being transmitted for display, second and subsequent frames may be prepared for display and sent to the secondary video memory 214. Frames awaiting transmission and display are held in the secondary video memory 214. In order to prepare the second frame, for example, for transmission and display, the second frame is compared to the first frame by the secondary video generator and differential video data is identified defining the differences between the first frame and the second frame. The differential video data is transmitted to the video interface 114. The video interface 114 combines the previous frame with the differential data to create a new frame differing from the previous frame as defined by the differential data. The video interface 114 then places the new frame in the position originally occupied by the first frame, transmits the new frame to the display 112 and discards the first frame. This process continues as new frames are to be transmitted.

Alternatively, it is possible to prepare differential data defining differences between a preceding and a succeeding frame and use the differential data to prepare new frames for display, even when the preceding frame is not the frame currently being displayed. For example, suppose video generator 212 has allocated sufficient secondary video memory 214 to hold the first through tenth frames and that the video interface 114 has a similar capacity. In such a case, analysis may be performed to create differential data between the first and second frame, the second and third frame, the third and fourth frame, and so on. This differential data is sent to the video interface 114, where the differential data defining differences between the first and second frames is applied to the first frame to create the second frame. The second frame is stored. The differential data defining differences between the second and third frames is applied to the second frame to create the third frame, and so on. This process may proceed as long as the secondary video memory 214 and the video interface 114 have capacity to store the necessary frames. As differential data is sent to the video interface 114, new frames can be stored in the secondary video memory 214 to create new differential data, and as frames stored in the video interface 114 are displayed, this differential data can be sent to the video interface 114 in order to create new frames. In this way, the storage capacity of the secondary video memory 214 and the video interface 114 are used to the fullest extent possible. By preparing differential data before it needs to be transmitted and by creating frames before they need to be displayed, it is possible to smooth the display of frames. For example, suppose five successive frames occur with relatively small changes between them. The differential data defining such changes will occupy a relatively narrow bandwidth and can be transmitted quickly and these five frames can be recreated in the video interface 114, ready for transmission. Suppose that a sixth frame appears, differing significantly from the fifth frame. The differential data defining the changes between the fifth and sixth frames will take longer to transmit. However, because the first through fifth frames are stored in the video interface 114 and ready for transmission, the transmission of the differential data used to define the sixth frame and the creation of the sixth frame can be accomplished while the first five frames are being displayed, without a need for a delay in the display of the sixth frame.

In order to minimize the use of bandwidth, it is possible to design the secondary video generator 212 so that it does not send differential data for each new frame. In one such embodiment, the secondary video generator 212 evaluates each frame received and compares it to the last frame for which differential data was prepared. If the changes between the currently received frame and the last frame do not reach a prescribed threshold, that is, if not enough difference exists between the currently received frame and the last frame, no differential data is prepared and the currently received frame is discarded. This procedure helps conserve bandwidth by sending data for construction of a new frame only when the new frame represents a sufficiently significant change from the last frame.

Differential data may be lost during transmission. As the loss of differential data accumulates, it may become progressively more difficult to recreate frames from the transmission of differential data. To overcome this problem, a full frame is periodically transmitted to be received and displayed, and to serve as a new baseline for the creation of differential data. Differential data is created using the synchronization frame and the following frame, the frame following that frame, and so on. Transmission of the synchronization frame may cause a slight delay or loss of smoothness in transmission, but only a relatively small number of frames will be synchronization frames and the loss of smoothness will be tolerable, and much less noticeable than if each frame were transmitted as a full frame. As an alternative or in addition to periodically transmitting a synchronization frame on a prescribed schedule, it is possible to assign a sequence number to each differential data item. In this way, loss of differential data may be detected by detection of a skip in the sequence numbers. Detection of a skip in the sequence numbers can be used as an indication that a full frame needs to be transmitted in order to restore the proper sequence.

It will be recognized that while USB ports are illustrated here, any number of external interfaces may be employed, so long as the external interface has sufficient information capacity to transfer information at the desired rate. It will further be recognized that while only two USB ports 116 and 222 are illustrated here, the present invention can support more than two secondary video interfaces and may be adapted to allow connection of a secondary video interface to every available USB port. Additional USB ports may be present in a computer such as the computer 202 or may be added using widely available adapters. The number of secondary video interfaces which may be supported is constrained primarily by the bandwidth limitations of the USB channel. If a version 2.0 USB is employed, a significant number of secondary interfaces may be employed, one or more of which may display very large amounts of video information, such as large full motion displays. Such displays may be used, for example, to display advertising or other promotional material while leaving the primary display free to display transaction information.

Figure 3:
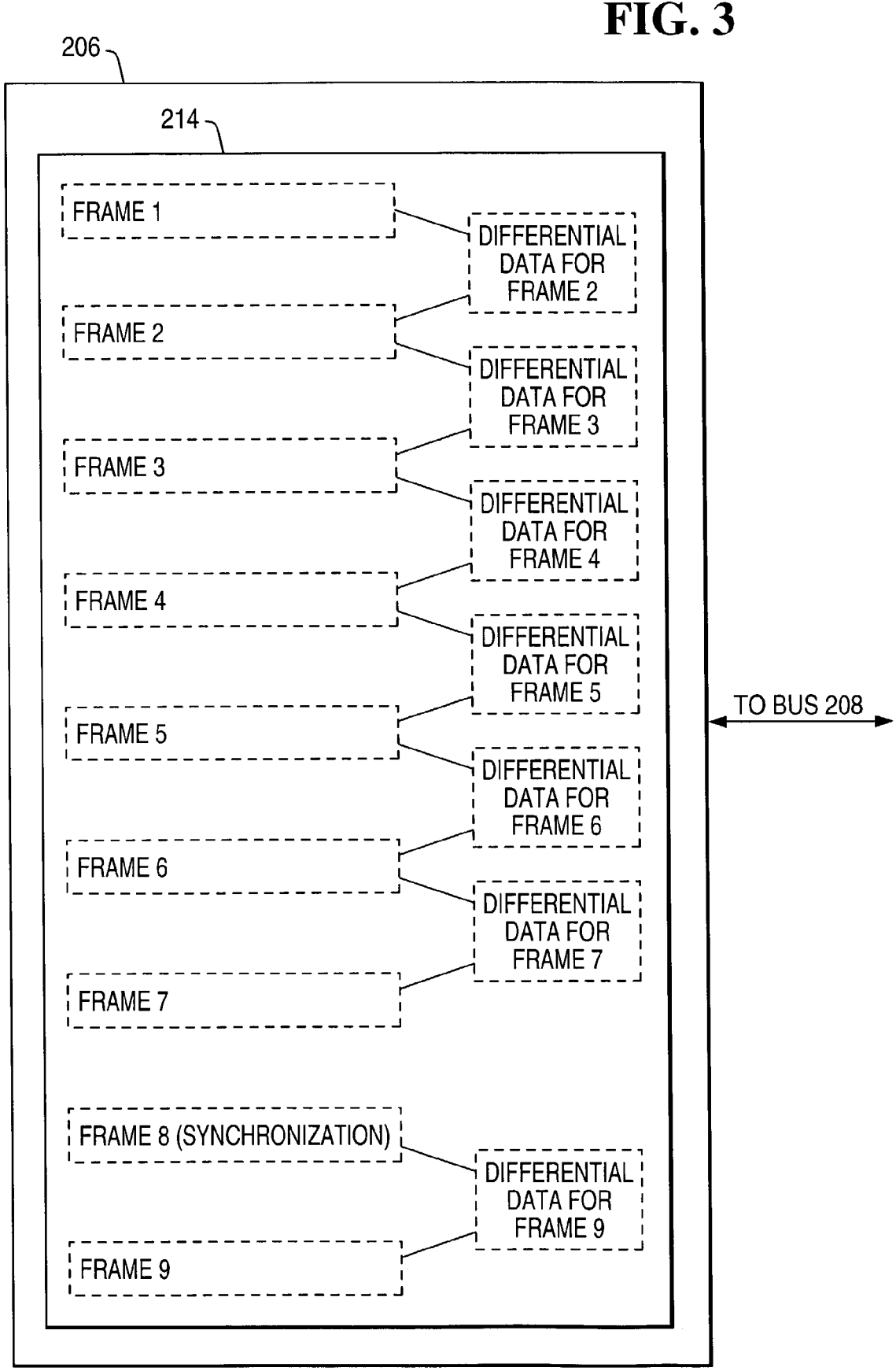
FIG. 3 illustrates details of the preparation of video frames for transmission to a video interface according to the present invention.

FIG. 3 illustrates the memory 206, showing the secondary video memory 214 and exemplary data items which may be created and stored within the secondary video memory 214. The secondary video memory 214 can be seen to contain frame 1 through frame 7. Frames 1–7 are frames of video data which have been prepared and placed in the secondary video memory 214 so that they can be processed for transmission to the video interface 114. Frame 1 and frame 2 have been compared and the differential data for frame 2 has been stored. That is, the data defining differences between frame 1 and frame 2 has been identified and stored. Similarly, frames 2 and 3 have been compared and the differential data for frame 3 have been stored, frames 3 and 4 have been compared and the differential data for frame 4 has been stored, and so on. The secondary video memory 214 can be seen to have a connection to the bus 208. The frames 1–7 are received from the bus 208 of FIG. 2 and the differential data sent to the bus 208, where it can be sent to the USB 220 and to the USB port 222. The frames of data can be transmitted to the secondary video memory 214 relatively quickly, and the processing to create the differential data can also take place relatively quickly. The differential data takes up much less bandwidth than would be required to transmit all the data comprising the frames.

In order to overcome the problem of loss of differential data, frame 8 is a synchronization frame, and sent to the bus 208 as a full frame for transmission and display. Creation of differential data resumes with frame 9. Differential data for frame 9 is created by comparing frame 8 and frame 9, and the transmission of differential data for reconstruction and display of the frames represented by the differential data resumes and continues until the next synchronization frame is to be sent.

Figure 4:
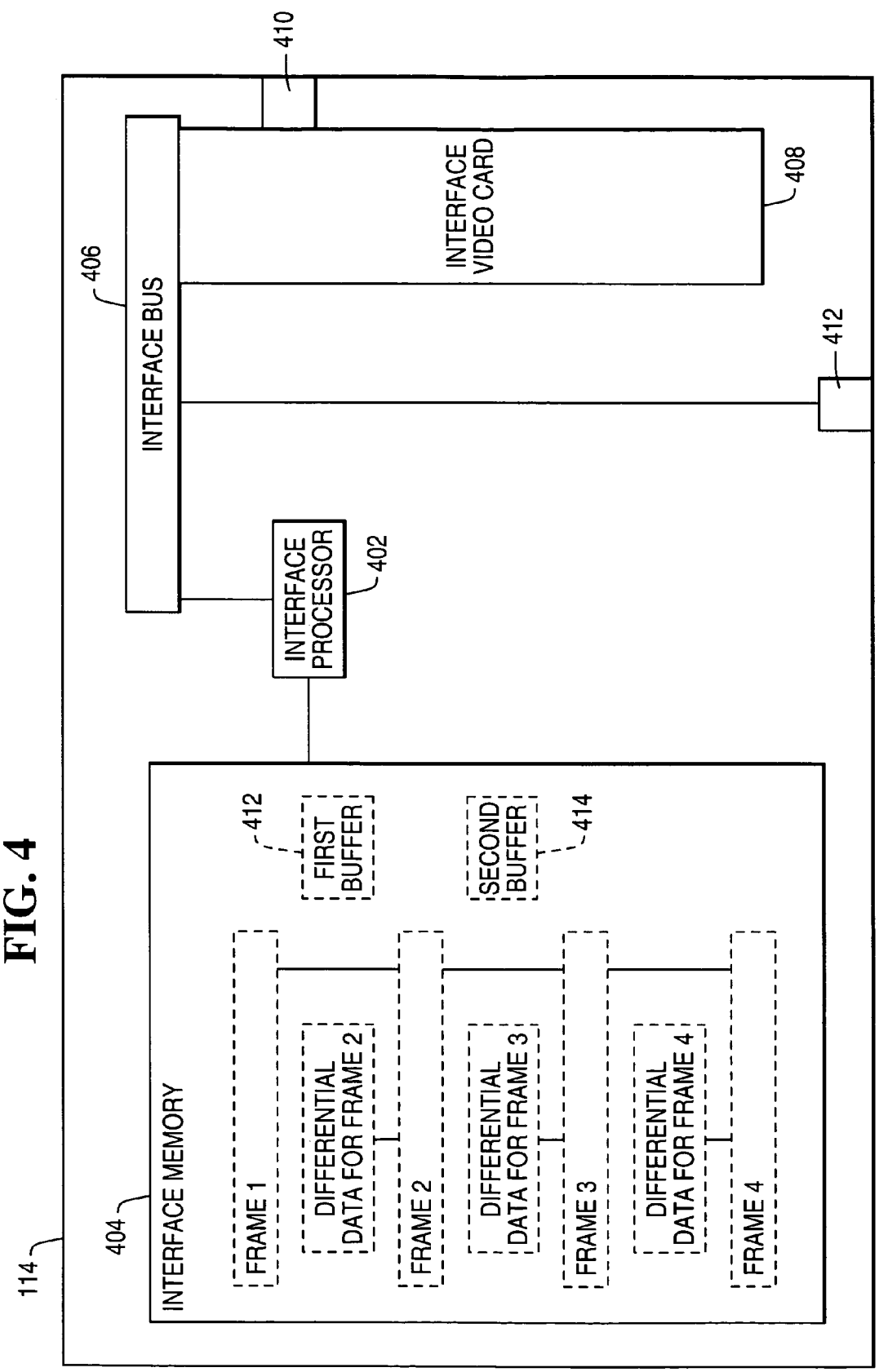
FIG. 4 illustrates a video interface according to an aspect of the present invention.

FIG. 4 illustrates additional details of the video interface 114. The video interface 114 includes an interface processor 402, interface memory 404, interface bus 406, interface video controller, shown here as an interface video card 408 including an interface video port 410, and a USB connection 412. The interface memory 404 can be seen to contain frames 1–4, and the differential data for frames 2–4. Frame 1 has been received from the computer 100 through the USB connection 412. The USB connection 412 connects to the USB port 116 of the computer 100 using a suitable cable such as the cable 120. The differential data for frames 2–4 is also received through the USB connection 412. The frames 2–4, however, are not transmitted from the computer 100. Instead, the frames 2–4 are constructed using frame 1 and the differential data. Frame 2 is constructed by suitably combining frame 1 and the differential data for frame 2. Once frame 2 is constructed, frame 3 is constructed by combining frame 2 and the differential data for frame 3, and once frame 3 is constructed, frame 4 is constructed by combining frame 3 and the differential data for frame 4.

When a frame is needed by the interface video card 408, it is passed to the interface video card 408 and cleared from the interface memory. Typically, the interface video card 408 holds two frames, the frame currently being displayed and the frame next in line for display. Therefore, initially the first two frames would be provided in rapid sequence to the interface video card 408 so that the card 408 could display the first frame and have the next frame ready for display. Once the required number of frames was passed to the card 408, the interface 114 would receive differential data to construct new frames of data to be held until needed by the card 408.

The interface video card 408 provides the frame to be displayed to a display such as the display 112 using the interface video port 410. New differential data is received and new frames created according to how much space is available in the interface memory 404 and when the differential data is received from the computer 100. For simplicity of illustration, only four frames and associated differential data are shown here, but it will be recognized that a smaller or larger number of frames may be present in the interface memory 404 at any one time. It will be recognized that numerous designs exists for a secondary video interface similar to the secondary video interface 114 shown here. Such designs need not include all the separate components 402–412 shown here, but instead the functions performed by these components may be performed by alternative components. It is possible to implement a secondary video by designing an interface comprising, for example, a microcontroller and a built in liquid crystal display (LCD) controller, with the interface implementing the various functions shown here. Such an interface could be built using a few chips and could be integrated into a display such as the display 112, without a need for a separate interface such as the interface 114.

In addition to providing components need for the decoding and display of secondary video data received as differential data, the interface 114 may also include one or more image buffers such as the first buffer 412 and the second buffer 414. The first and second buffers 412 and 414 may be implemented by permanently or temporarily allocating a portion of the interface memory 404, and may hold images, such as advertising images, that are desired to be displayed on short notice. Such images may be received from the terminal 100 at startup or at another suitable time, and may be held until it is desired to display the image. When it is desired to display an image held in the first or second buffer 412 or 414, the terminal can send a command to the interface 114 to display the image held in the buffer. Because the image is residing in the interface 114, the image can be quickly transferred to the video card 408 for display.

In addition to designing or using a terminal such as the terminal 100 to support one or more secondary displays, it is also possible to install suitable software on an existing prior art terminal and connect a video interface such as the video interface 114 to the terminal, in order to support one or more secondary displays. A secondary video generator such as the secondary video generator 212 may be developed for installation on an existing terminal. The video generator 212 and video generators are preferably designed to operate on a wide variety of terminals. A video generator such as the video generator 212 is preferably adapted to operate with a computer operating system and would not be restricted to operation on a specific model of terminal or computer. Any differences between video generator software adapted for installation on a newly developed terminal and video generator software adapted for installation on a presently existing terminal would be directed more toward differences in the operating systems used by the different terminals rather than any inherent differences in the terminals. Therefore, a video generator developed for installation on an existing terminal would differ from a video generator preinstalled on a newly developed terminal only in adaptations necessary for compatibility with the correct operating system and in being adapted for installation on a terminal. Such a video generator, like the video generator 212, is implemented be installed on a PC as a video driver, and will appear to the PC operating system as a video driver. A variety of different versions of the video generator may be developed, one for each operating system with which it is desired to use the video generator. Upon installation, the video generator receives video data to be displayed on one or more secondary displays and processes the video data in a fashion similar to the video generator 212. A secondary video interface similar or identical to the interface 114 is connected to the terminal in which the secondary video generator is installed, and a secondary display similar or identical to the display 112 is attached to the interface 114. In this way, an existing terminal can be modified to add one or more secondary displays without a need to redesign the terminal or add any hardware to the terminal other than the secondary video interface and secondary display, which are attached using existing connection ports present in the terminal.

Figure 5:
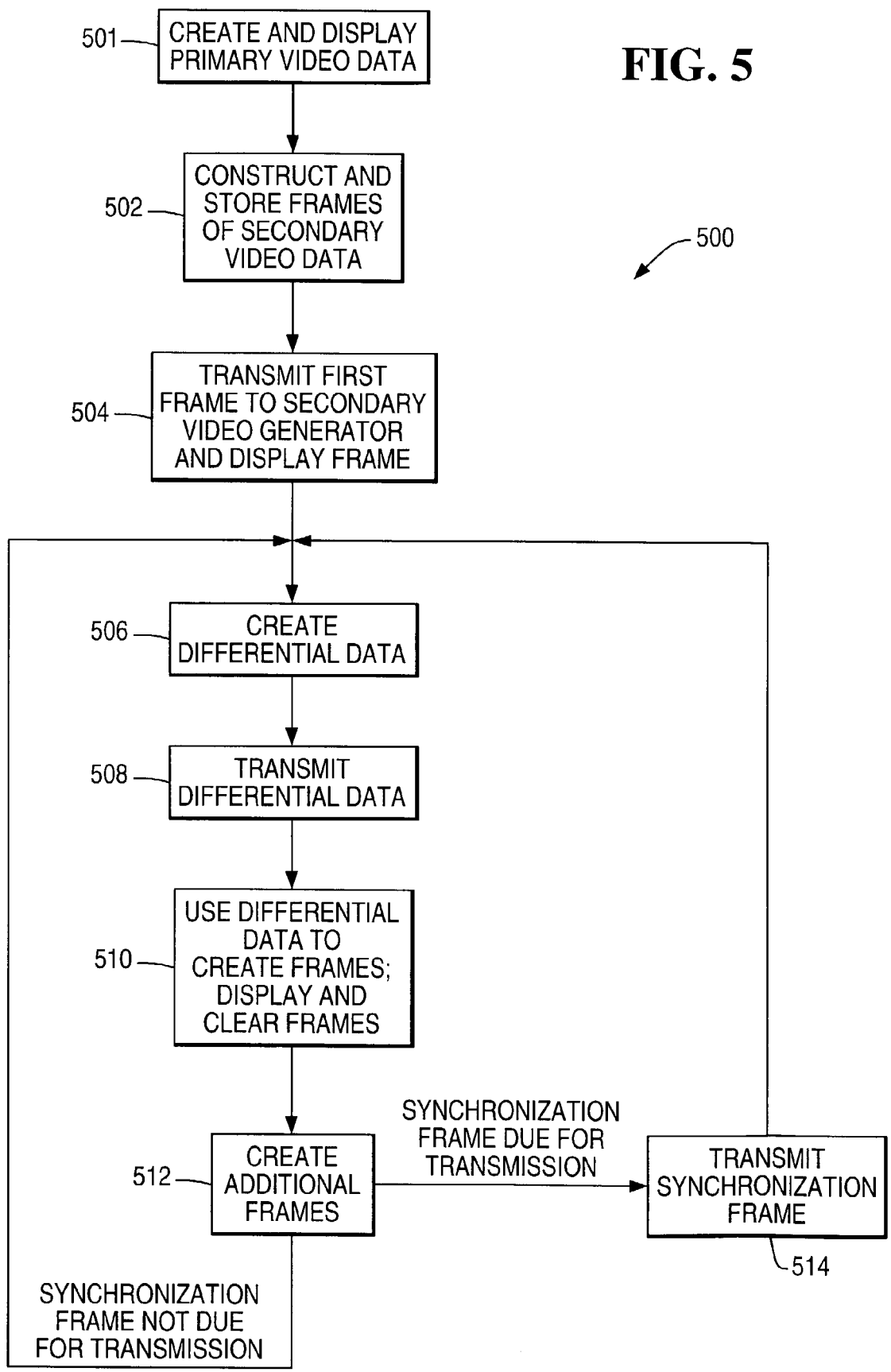
FIG. 5 illustrates a process of video display according to an aspect of the present invention.

FIG. 5 illustrates a process 500 of secondary video display by a point of sale terminal according to the present invention. The process 500 may suitably be implemented using a terminal such as the terminal 100 of FIGS. 1 and 2. At step 501, primary video data is created and displayed, suitably through the use of a conventional video card and display. At step 502, a plurality of frames of secondary video data are constructed and stored. The frames of video data may suitably be designed for sequential display by a terminal such as the terminal 100 of FIG. 1, on a secondary display such as the display 112 of FIG. 1. At step 504, the first frame of video data is transmitted to a video interface and displayed. At step 506, the frames of video data are examined and differential data is created. The differential data identifies differences between first and second members of pairs of frames, and a frame identical to the second member can be constructed by applying the differential data to the first member. Differential data is created defining differences between the first and second frame, the second and third frame, the third and fourth frame and so on. At step 508, the differential data is transmitted to the video interface. At step 510, the differential data is applied to the first and subsequent frames to create a succession of frames. The differential data defining differences between the first and second frames is applied to the first frame to reconstruct the second frame, the differential data defining differences between the second and third frames is applied to the second frame to reconstruct the third frame, and so on. As each frame is created, it is displayed and then cleared. At step 512, additional frames of video data are created, from which differential data may be created and transmitted to the video interface. If no synchronization frame is due to be sent, the process returns to step 506. If a synchronization frame is due to be sent, the process proceeds to step 512, a synchronization frame is sent as a full frame, rather than through the creation and transmission of differential data, and the process returns to step 506.

While the present invention is disclosed in the context of a presently preferred embodiment, it will be recognized that a wide variety of implementations may be employed by persons of ordinary skill in the art consistent with the above discussion and the claims which follow below. In particular, it will be recognized that the present invention need not be restricted to use with point of sale terminals, but can easily be employed with personal computers having appropriate output ports, such as USB ports, capable of transferring data at a sufficiently high rate, and the ability to accommodate a secondary video generator such as that described above.

We claim:

1. A point of sale terminal comprising:
a processor for processing data, the processor being operative to create and process video data, the video data being organized in the form of frames of video data;
memory for receiving and storing data including the frames of video data;
a video card for receiving frames of video data and producing primary video data organized for display;
a primary display for receiving the primary video data from the video card and displaying the primary video data;
a plurality of external data communication ports to allow transmission of video data to an external device, the plurality of external data communication ports including one or more universal serial bus ports,
a secondary video generator in the form of a software program executed by the processor for analyzing and processing frames of video data for display by a secondary display, the secondary video generator being operative to (1) receive frames of video data from the memory, (2) analyze the frames of video data to create differential data to allow reconstruction of the frames of video data using the differential data, and (3) transmit one or more frames of video data and the differential data to an external device using one of the plurality of external data communication ports,
wherein the differential data is created by analyzing pairs of frames of video data, each pair comprising a frame and a preceding frame, and wherein a set of differential data for each frame following a first frame is created and stored, each set of differential data defining differences between the frame for which it is created and stored and the preceding frame;
a secondary video interface operative to receive the one or more frames of video data and the differential data transmitted by the secondary video generator, and to use the received frames of video data and the differential data to successively reconstruct each frame of video data for which the differential data was created,
wherein the secondary video interface further comprises a video card, wherein the video card is provided with the reconstructed frames for display; and
a secondary display operative to receive and display video data from the secondary video interface.

2. The terminal of claim 1 wherein the plurality of external data communication ports includes one or more wireless communication interfaces.

3. The terminal of claim 1 wherein the secondary video interface further comprises one or more video buffers for storing video information, the secondary video interface being further operative to transfer the stored video information for display upon receipt of a command.

4. A point of sale terminal comprising:
a processor operative to create and process frames of primary and secondary video data, the frames of secondary video data being different from the frames of primary video data;
a primary video card operative to produce primary video output from the frames of primary video data;
a primary display operative to display the primary video output;
a secondary video generator operative to receive the frames of secondary video data and create sets of differential data, each set of differential data defining differences between frames of secondary video data; and a secondary video interface operative to:
    receive one or more frames of secondary video data and one or more sets of differential data from the secondary video generator;
    use the one or more sets of differential data and at least one of the one or more received frames of secondary video data to reconstruct one or more additional frames of secondary video data; and
    produce secondary video output from the one or more received and the one or more reconstructed frames of secondary video data.

5. The terminal of claim 4 wherein the secondary video interface receives a first frame of secondary video data and one or more sets of differential data from the secondary video generator, and successively reconstructs one or more frames of secondary video data corresponding to the one or more sets of differential data.

6. The terminal of claim 4 further comprising a secondary display operative to display the secondary video output from the secondary video interface.

7. The terminal of claim 4 wherein the secondary video interface comprises a secondary video card operative to produce the secondary video output from the one or more received and the one or more reconstructed frames of secondary video data.

8. The terminal of claim 4 wherein the secondary video interface comprises one or more video buffers for storing video information, the secondary video interface being further operative to transfer the stored video information for display upon receipt of a command.

9. The terminal of claim 4, wherein the secondary video interface is further operative to receive the one or more frames of secondary video data and the one or more sets of differential data from the secondary video generator through a universal serial bus connection.

10. The terminal of claim 4, wherein the secondary video interface is further operative to receive the one or more frames of secondary video data and the one or more sets of differential data from the secondary video generator through a wireless connection.

11. The terminal of claim 10, wherein the wireless connection comprises a Bluetooth connection.

* * * * *